(12) United States Patent
Kwon et al.

(10) Patent No.: US 10,935,132 B2
(45) Date of Patent: *Mar. 2, 2021

(54) GEAR SHIFTING APPARATUS FOR MULTI-SPEED TRANSMISSION FOR ELECTRIC VEHICLES

(71) Applicants: Hyundai Motor Company, Seoul (KR); KIA Motors Corporation, Seoul (KR)

(72) Inventors: Sun Sung Kwon, Anyang-si (KR); Soonki Eo, Ansan-si (KR); Ma Ru Kang, Yongin-si (KR); Minho Chae, Incheon (KR); Yong Uk Shin, Suwon-si (KR); Chon Ok Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,920

(22) Filed: Oct. 18, 2019

(65) Prior Publication Data

US 2020/0166132 A1 May 28, 2020

(30) Foreign Application Priority Data

Nov. 27, 2018 (KR) .......................... 10-2018-0147972

(51) Int. Cl.
  *F16H 63/32* (2006.01)
  *F16H 63/34* (2006.01)
  *B60T 1/00* (2006.01)

(52) U.S. Cl.
  CPC .......... *F16H 63/3433* (2013.01); *B60T 1/005* (2013.01); *F16H 63/32* (2013.01); *F16H 63/3466* (2013.01)

(58) Field of Classification Search
  CPC .. F16H 63/3433; F16H 63/3466; F16H 63/32; F16H 63/304; F16H 61/32; F16H 63/18; F16H 2063/3056; F16H 2063/3083; F16H 2061/2869; F16H 2200/0021; B60T 1/005; B60T 1/062; F16D 63/006
  See application file for complete search history.

(56) References Cited

U.S. PATENT DOCUMENTS 9,242,623 B2   1/2016  Burgardt et al.
2007/0272511 A1* 11/2007 Saitoh ................. F16H 63/3416
                                                                   192/219.5

(Continued)

*Primary Examiner* — David J Hlavka
(74) *Attorney, Agent, or Firm* — Brinks Gilson & Lione (57) ABSTRACT

A gear shifting apparatus for a multi-speed transmission includes a shifting unit controlling gear shifting by a torque of an actuator and a parking unit controlling a parking state by the torque of the actuator. The actuator includes a control motor transmitting a driving torque to driven gears of the shifting and parking units through a drive gear externally gear-meshed with the driven gears. The shifting unit includes a cam block connected to a first driven gear engaged with the drive gear and having a cam surface on an exterior circumference for shift-stages for controlling gear shifting. In addition, the parking unit includes a parking gear and a parking sprag having an engagement end for controlling engagement and disengagement of a parking state.

18 Claims, 8 Drawing Sheets

(56) References Cited

U.S. PATENT DOCUMENTS

| | | | |
|---|---|---|---|
| 2009/0173594 A1* | 7/2009 | Joshi | F16H 63/3416 |
| | | | 192/219.5 |
| 2018/0038480 A1* | 2/2018 | Scalici | F16H 63/3466 |
| 2020/0158234 A1* | 5/2020 | Kwon | F16H 63/3433 |
| 2020/0166127 A1* | 5/2020 | Kwon | F16H 61/32 |
| 2020/0166130 A1* | 5/2020 | Kwon | F16H 63/3466 |

\* cited by examiner

GEAR SHIFTING APPARATUS FOR MULTI-SPEED TRANSMISSION FOR ELECTRIC VEHICLES

CROSS-REFERENCE TO RELATED APPLICATION

This application claims priority to and the benefit of Korean Patent Application No. 10-2018-0147972 filed on Nov. 27, 2018, which is incorporated herein by reference in its entirety.

FIELD

The present disclosure relates to a gear shifting apparatus for multi-speed transmission for electric vehicles.

BACKGROUND

The statements in this section merely provide background information related to the present disclosure and may not constitute prior art.

An automated manual transmission (AMT), a dual clutch transmission (DCT), or a multi-speed transmission for an electric vehicle is typically employed to automatically shift gears between as many shift-stages as a conventional manual transmission. Such a transmission is typically provided with a parking actuator for an automated parking, as well as a shifting actuator for realizing automatically shifting gears.

A multi-speed transmission of an electric vehicle is typically employs a shift-by-wire scheme, where shifting is electronically controlled based on driver's input signal generated by a driver's operation of a shift lever or a shift button. Since an electric vehicle may practically realize a continuously variable shifting by controlling an output power of a drive motor, shift-stages as many as more than two are not typically required, whereby a shifting unit installed in such an electric vehicle utilizes only one or two shift forks.

Such a multi-speed transmission of an electric vehicle employs at least at least one control motor as a shifting actuator for realizing the gear shifting between the available shift-stages. In addition, a control motor is separately employed as a parking actuator to control a parking sprag for engaging and releasing a parking gear.

We have discovered that separately employing control motors in a shifting unit for gear-shifting and in a parking unit for engaging and releasing a parking gear may result complication of a multi-speed transmission, an increase in a production cost due to increased number of required parts, and an increase of a vehicle weight.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a gear shifting apparatus for a multi-speed transmission for an electric vehicle having advantages of realizing both the shifting function and the parking function shifting unit by a control motor, enabling control of first and second shift-stages and a parking stage, thereby realizing simplification of structure, cost reduction due to less number of required parts, and weight reduction.

A gear shifting apparatus for a multi-speed transmission for an electric vehicle may include a shifting unit controlling gear shifting by a torque of an actuator, and a parking unit controlling engagement and disengagement of a parking state by the torque of the actuator.

The actuator may include a control motor transmitting a driving torque to driven gears of the shifting unit and the parking unit through a drive gear externally gear-meshed with the driven gears.

According to an exemplary form of the present disclosure, the shifting unit may include a fork slider slidably mounted on a fork rail, a shift fork integrally formed with the fork slider and activating the gear shifting, a cam block connected to a first driven gear externally engaged with the drive gear and having a cam surface on an exterior circumference for shift-stages, a cam contact pin integrally formed with the fork slider and contacting a cam surface formed on an exterior circumference of the cam block, and a return spring mounted around the fork rail and abutting the fork slider toward the cam block.

According to a further aspect of the present disclosure, the parking unit may include a parking gear, a parking sprag having an engagement end facing the parking gear, being rotatable about an axis of a sprag shaft, and abutted toward a parking release direction by a return spring, a screw housing having an interior screw hole and connected to a second driven gear externally engaged with the drive gear, a parking rail having an exterior screw engaged with the screw hole of the screw housing and having a first plunger receiving indentation and a stopper formed on an exterior circumference of the parking rail, a guide rail disposed in parallel with the parking rail and having a second plunger receiving indentation at a location facing the first plunger receiving indentation, a parking lug having two penetration holes that movably receive the parking rail and the guide rail, respectively, and having an operation hole in an interior of the parking lug between the parking rail and the guide rail, in a direction perpendicular to the parking rail and the guide rail, a plunger inserted in the operation hole of the parking lug between the parking rail and the guide rail and selectively coupled with the first plunger receiving indentation and the second plunger receiving indentation according to relative movement of the parking rail and the parking lug with respect to the guide rail, a rotation prevention guider fixed to the parking rail and coupled with the guide rail to inhibit or prevent rotation of the parking rail, a parking lever rotatably mounted on a lever shaft and maintaining contact with an exterior side of the parking lug by a return spring, and a parking rod connected to a bottom portion of the parking lever and having a cam portion interacting with an end of the parking sprag distal to the sprag shaft.

A speed reduction may be achieved when the torque of the control motor is transmitted from the drive gear to the first and second driven gears.

A reduction ratio between the drive gear and the second driven gear may be smaller than a reduction ratio between the drive gear and the first driven gear.

The stopper may be formed in a circular ring shape and integrally formed with the parking rail.

The first and second plunger receiving indentations are respectively formed in a hemispherical shape. Both ends of the plunger are respectively formed in a hemispherical shape fitting the first and second plunger receiving indentations.

The parking lever may rotate at an axis of the lever shaft and thereby horizontally operates the parking rod.

The cam portion of the parking rod may press the end of the parking sprag to force the engagement end of the sprag to engage with the parking gear.

The cam surface may include a neutral range, a first shift-stage range, and a second shift-stage range along the exterior circumference of the cam block.

According to a second exemplary form of the present disclosure, the shifting unit may include a fork slider slidably mounted on a fork rail, a shift fork integrally formed with the fork slider and activating the gear shifting, a profile drum connected to a first driven gear externally engaged with the drive gear and having a profile groove on an exterior circumference for shift-stages, and a profile pin integrally formed with an upper part of the fork slider and inserted in the profile groove formed on the exterior circumference of the profile drum.

According to a further aspect of the present disclosure, the parking unit may include a parking gear, a parking sprag having an engagement end facing the parking gear, being rotatable about an axis of a sprag shaft, and abutted toward a parking release direction by a return spring, a screw housing having an interior screw hole and connected to a second driven gear externally engaged with the drive gear, a parking rail having an exterior screw engaged with the screw hole of the screw housing and having a first plunger receiving indentation and a stopper formed on an exterior circumference of the parking rail, a guide rail disposed in parallel with the parking rail and having a second plunger receiving indentation at a location facing the first plunger receiving indentation, a parking lug having two penetration holes that movably receive the parking rail and the guide rail, respectively, and having an operation hole in an interior of the parking lug between the parking rail and the guide rail, in a direction perpendicular to the parking rail and the guide rail, a plunger inserted in the operation hole of the parking lug between the parking rail and the guide rail and selectively coupled with the first plunger receiving indentation and the second plunger receiving indentation according to relative movement of the parking rail and the parking lug with respect to the guide rail, a rotation prevention guider fixed to the parking rail and coupled with the guide rail to inhibit or prevent rotation of the parking rail, a parking lever rotatably mounted on a lever shaft and maintaining contact with an exterior side of the parking lug by a return spring, and a parking rod connected to a bottom portion of the parking lever and having a cam portion interacting with an end of the parking sprag distal to the sprag shaft.

A speed reduction may be achieved when the torque of the control motor is transmitted from the drive gear to the first and second driven gears.

A reduction ratio between the drive gear and the second driven gear may be smaller than a reduction ratio between the drive gear and the first driven gear.

The profile groove may be formed with different phases in an axial direction of the profile drum. The profile groove may include a neutral range for a neutral shift-stage, a first shift-stage range for a first shift-stage, and a second shift-stage range for a second shift-stage.

According to a third exemplary form of the present disclosure, the shifting unit may include a fork slider slidably mounted on a fork rail, a shift fork integrally formed with the fork slider and activating the gear shifting, a finger drum connected to a first driven gear externally engaged with the drive gear, and having a finger end on an exterior circumference, and a parking lug rotatable about a centrally positioned lug shaft, having two lug ends of different lengths interacting with the finger end to support or release the finger end along a rotation direction of the finger drum, and having a coupler end coupled with a pocket portion formed at the fork slider, the coupler end being distal to the two lug ends.

According to a further aspect of the present disclosure, the parking unit may include a parking gear, a parking sprag having an engagement end facing the parking gear, being rotatable about an axis of a sprag shaft, and abutted toward a parking release direction by a return spring, a screw housing having an interior screw hole and connected to a second driven gear externally engaged with the drive gear, a parking rail having an exterior screw engaged with the screw hole of the screw housing and having a first plunger receiving indentation and a stopper formed on an exterior circumference of the parking rail, a guide rail disposed in parallel with the parking rail and having a second plunger receiving indentation at a location facing the first plunger receiving indentation, a parking lug having two penetration holes that movably receive the parking rail and the guide rail, respectively, and having an operation hole in an interior of the parking lug between the parking rail and the guide rail, in a direction perpendicular to the parking rail and the guide rail, a plunger inserted in the operation hole of the parking lug between the parking rail and the guide rail and selectively coupled with the first plunger receiving indentation and the second plunger receiving indentation according to relative movement of the parking rail and the parking lug with respect to the guide rail, a rotation prevention guider fixed to the parking rail and coupled with the guide rail to inhibit or prevent rotation of the parking rail, a parking lever rotatably mounted on a lever shaft and maintaining contact with an exterior side of the parking lug by a return spring, and a parking rod connected to a bottom portion of the parking lever and having a cam portion interacting with an end of the parking sprag distal to the sprag shaft.

A speed reduction may be achieved when the torque of the control motor is transmitted from the drive gear to the first and second driven gears.

A reduction ratio between the drive gear and the second driven gear may be smaller than a reduction ratio between the drive gear and the first driven gear.

A multi-speed transmission of an electric vehicle of an exemplary form of the present disclosure realizes both the shifting function and the parking function shifting unit by a control motor while maintaining control reliability, thereby realizing simplification of structure, a cost reduction due to decreased number of required parts, and a weight reduction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

In the following description, dividing names of components into first, second and the like is to divide the names because the names of the components are the same as each other and an order thereof is not particularly limited.

Figure 1:
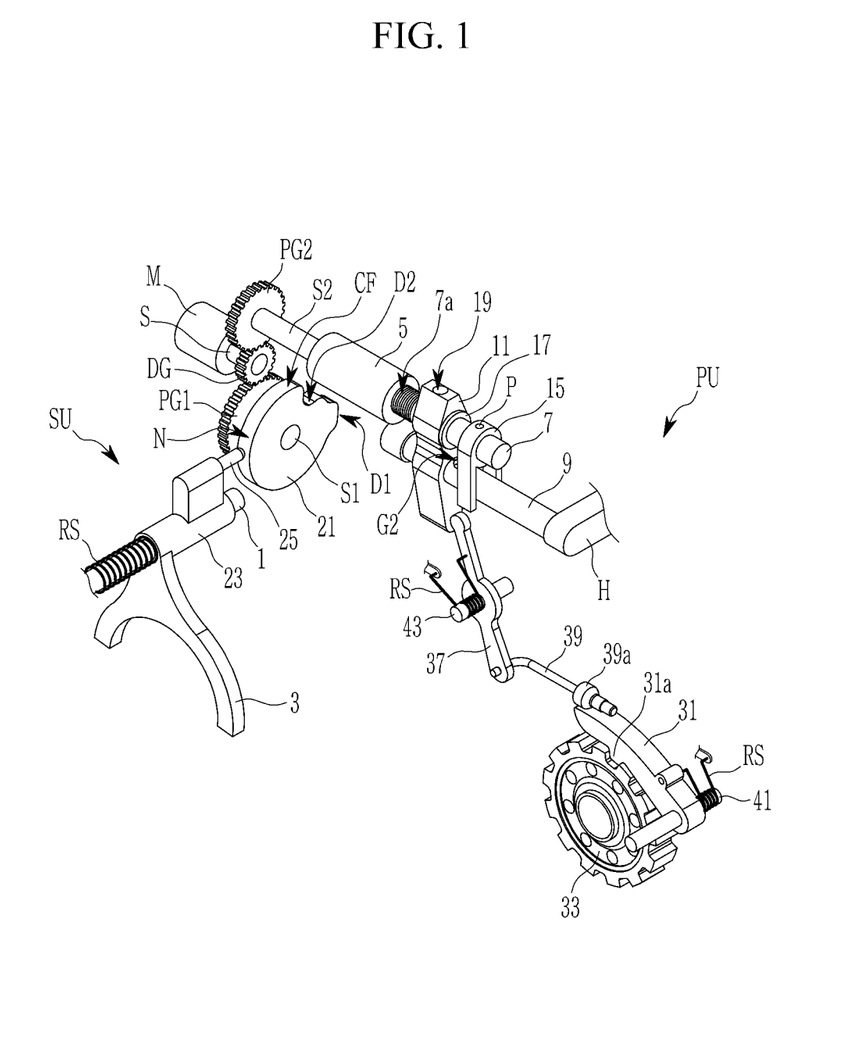
FIG. 1 is a schematic perspective view of a gear shifting apparatus for a multi-speed transmission for an electric vehicle according to the first exemplary form of the present disclosure.

For convenience of description of an exemplary form of the present disclosure, directions are described as left and right with a mere reference to FIG. 1, and may be understood that such direction is intrinsic to an actual apparatus.

Figure 2:
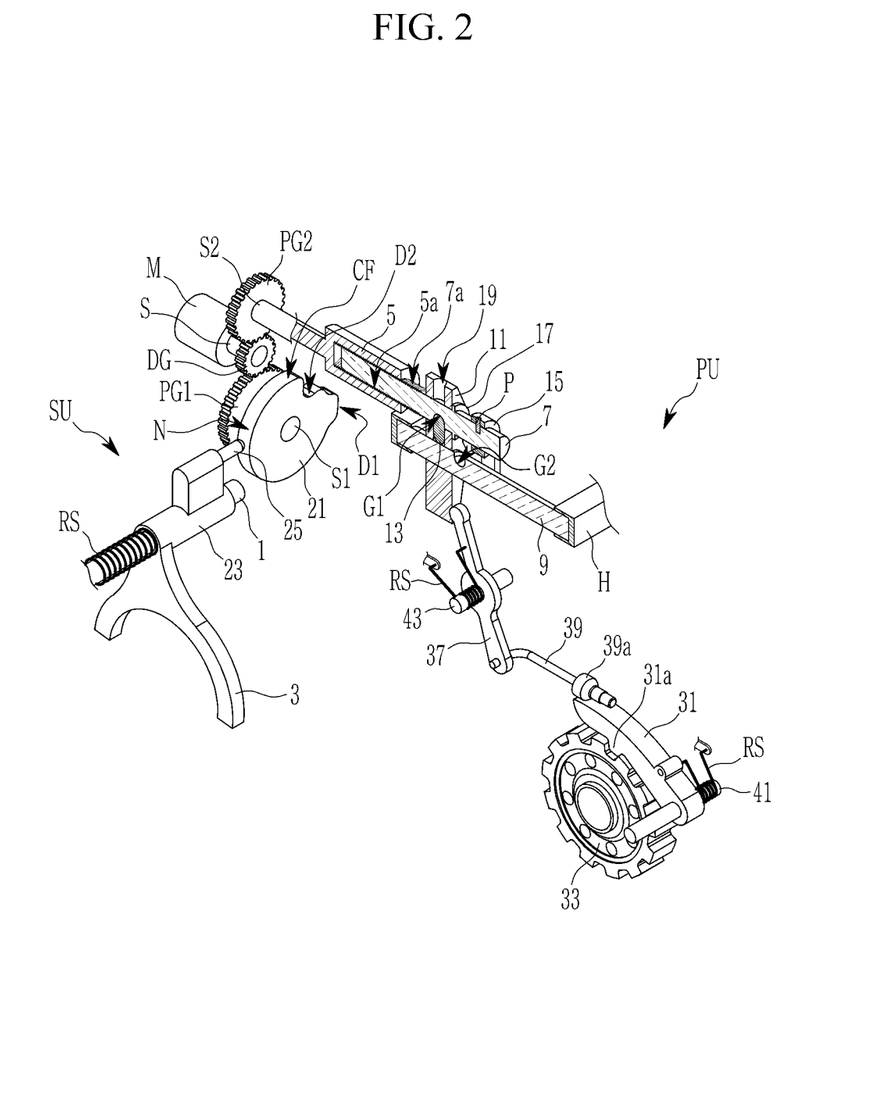
FIG. 2 is a partially cutaway perspective view of a gear shifting apparatus for a multi-speed transmission for an electric vehicle according to the first exemplary form of the present disclosure.

FIG. 1 is a schematic perspective view of a gear shifting apparatus for a multi-speed transmission for an electric vehicle according to a first exemplary form of the present disclosure. FIG. 2 is a partially cutaway perspective view of a gear shifting apparatus for a multi-speed transmission for an electric vehicle according to the first exemplary form of the present disclosure.

A gear shifting apparatus according to the first exemplary form of the present disclosure is described with reference to an example of a two-staged transmission of an electric vehicle.

It should be noted that a gear shifting apparatus according to the first exemplary form of the present disclosure may be applied to a transmission other than a two-staged transmission. In this case, an additional shifting unit and/or an additional control motor may be employed for further number of shift-stages.

Referring to FIG. 1 and FIG. 2, a gear shifting apparatus according to the first exemplary form of the present disclosure includes an actuator, a shifting unit SU receiving a torque from the actuator and controls gear shifting through a shift fork 3 installed on a fork rail 1, and a parking unit PU receiving a torque from the actuator and controlling engagement and disengagement of a parking gear 33 through a parking sprag 31.

The actuator includes a control motor M driving a drive gear DG externally gear-meshed with driven gears PG1 and PG2 of the shifting unit SU and the parking unit PU.

The shifting unit SU and the parking unit PU convert the torque of the control motor M to horizontal forces to operate of the shift fork 3 and the parking sprag 31.

The drive gear DG is mounted on a rotation shaft S of the control motor M.

The shifting unit SU includes a fork slider 23, a shift fork 3, a cam block 21, a cam contact pin 25, and a return spring RS.

The fork slider 23 is slidably mounted on a fork rail 1 fixed to a transmission housing (not shown).

The shift fork 3 is integrally formed to a lower part of the fork slider 23 slidable along the fork rail 1, and to enable synchronizer operation, is connected to the sleeve (not shown) of the synchronizer (not shown) for shifting to the first shift-stage and the second shift-stage.

A cam surface CF is formed on an exterior circumference of the cam block 21, and is connected to a first connecting shaft S1 forming a rotation center of the first driven gear PG1 externally engaged with the drive gear DG.

The drive gear DG and the first driven gear PG1 form a reduction gear ratio such that a speed reduction is realized when the torque of the control motor M is transmitted to the cam block 21.

The cam block 21 converts the torque of the control motor M to a horizontal force through the curve of the cam surface CF and transmits the horizontal force to the shift fork 3 as driving forces.

The cam surface CF is formed on the exterior circumference of the cam block 21, and forms ranges of a neutral range N, a first shift-stage range D1, and a second shift-stage range D2.

The cam contact pin 25 is integrally formed to an upper part of the fork slider 23, and maintains contact with the cam surface CF formed on the exterior circumference of the cam block 21.

The return spring RS is formed as a coil spring mounted around the fork rail 1. One end of the return spring RS is supported by a fixture such as the transmission housing (not shown), and another end of the return spring RS elastically abuts the fork slider 23 toward the cam block 21, such that the cam contact pin 25 may maintain contact with the cam surface CF of the cam block 21.

The parking unit PU includes a parking gear 33 installed on an output shaft or an intermediate shaft in a transmission, a parking sprag 31, a screw housing 5, a parking rail 7, a guide rail 9, a parking lug 11, a plunger 13, a rotation prevention guider 15, a parking lever 37, and a parking rod 39.

The parking sprag 31 includes an engagement end 31a protruding from the parking sprag 31 and engaged with teeth of the parking gear 33, and disposed such that the engagement end 31a may face the parking gear 33. The parking sprag 31 is fixed to a sprag shaft 41.

A return spring RS mounted around the sprag shaft 41 always acts an elastic force on the parking sprag 31 in a parking release direction.

The screw housing 5 is formed with an interior screw hole 5a formed as a threaded interior circumference of the screw housing 5. The screw housing 5 is connected to a second driven gear PG2 through a second connecting shaft S2, while second driven gear PG2 is externally engaged with the drive gear DG. Therefore, the screw housing 5 rotates by receiving the torque of the control motor M.

The drive gear DG and the second driven gear PG2 form a reduction gear ratio such that a speed reduction is realized when the torque of the control motor M is transmitted to the screw housing 5.

Gear ratios of the drive gear DG and the first and second driven gears PG1 and PG2 is set such that a reduction ratio between the drive gear DG and first driven gear PG1 is smaller than a reduction ratio between the drive gear DG and the second driven gear PG2.

The parking rail 7 is formed in a cylindrical bar shape, and disposed along a same axis with the screw housing 5 and the second connecting shaft S2. A screw 7a is formed on an exterior circumference of the parking rail 7, and thereby the parking rail 7 is engaged with the screw housing 5 through the screw hole 5a.

A first plunger receiving indentation G1 and a stopper 17 are formed on an exterior circumference of the parking rail 7. The first plunger receiving indentation G1 is positioned closer to the screw 7a in comparison with the stopper 17.

The stopper 17 is formed in a circular ring shape and integrally formed with the parking rail 7. The stopper 17 forces the parking lug 11 to move together with the parking rail 7 when the parking rail 7 moves to the left along the axial direction in FIG. 1.

The guide rail 9 is disposed in parallel with the parking rail 7, and fixed to a transmission housing H.

A second plunger receiving indentation G2 is formed at the guide rail 9 at a location facing the first plunger receiving indentation G1.

The first and second plunger receiving indentations G1 and G2 are respectively formed in a same hemispherical indentation.

The parking lug 11 is formed with two penetration holes that movably receive the parking rail 7 and the guide rail 9, respectively.

The parking lug 11 being mounted on the guide rail 9 fixed to the transmission housing H may support the parking rail 7. An operation hole 19 is formed in an interior of the parking lug 11 between the parking rail 7 and the guide rail 9, in a direction perpendicular to the parking rail 7 and the guide rail 9.

For example, as shown in FIG. 2, the operation hole 19 is vertically formed in a cylindrical shape to fully connect the two penetration holes that receive the parking rail 7 and the guide rail 9.

The plunger 13 is inserted in the operation hole 19 of the parking lug 11 between the parking rail 7 and the guide rail 9.

The plunger 13 is selectively coupled with the first plunger receiving indentation G1 and the second plunger receiving indentation G2 according to relative movement of the parking rail 7 and the parking lug 11 with respect to the guide rail 9.

The plunger 13 is formed in a shape of a cylindrical pin having both ends shaped in a hemispherical shape fittable to the first and second plunger receiving indentations G1 and G2.

The rotation prevention guider 15 is fixed to the parking rail 7 by a pin P, and includes two legs protruding downward to receive the guide rail 9 between the legs to prevent or inhibit rotation of the parking rail 7.

That is, the rotation prevention guider 15 prevents or inhibits parking rail 7 to rotate while the parking rail 7 reciprocally moves by the rotation of the screw housing 5.

The parking lever 37 is rotatably mounted on the lever shaft 43 fixed to the transmission housing, a top end of the parking lever 37 maintain contact with a lower right side (in FIG. 1) of the parking lug 11 by a return spring RS mounted around the lever shaft 43.

A cam portion 39a is formed on the parking rod 39 at a location corresponding to a front end of the parking sprag 31, and a rear end of the parking rod 39 is connected to a bottom end of the parking lever 37.

When the parking lever 37 rotates around an axis of the lever shaft 43, the parking rod 39 is horizontally operated. In this case, the cam portion 39a of the parking rod 39 presses an end of the parking sprag 31 that is rotatable around an axis of the sprag shaft 41, such that the engagement end 31a is engaged with the parking gear 33. The cam portion 39a is provided with a conical lateral surface to enable smooth rotation of the parking sprag 31 when the parking rod reciprocates.

Figure 3:
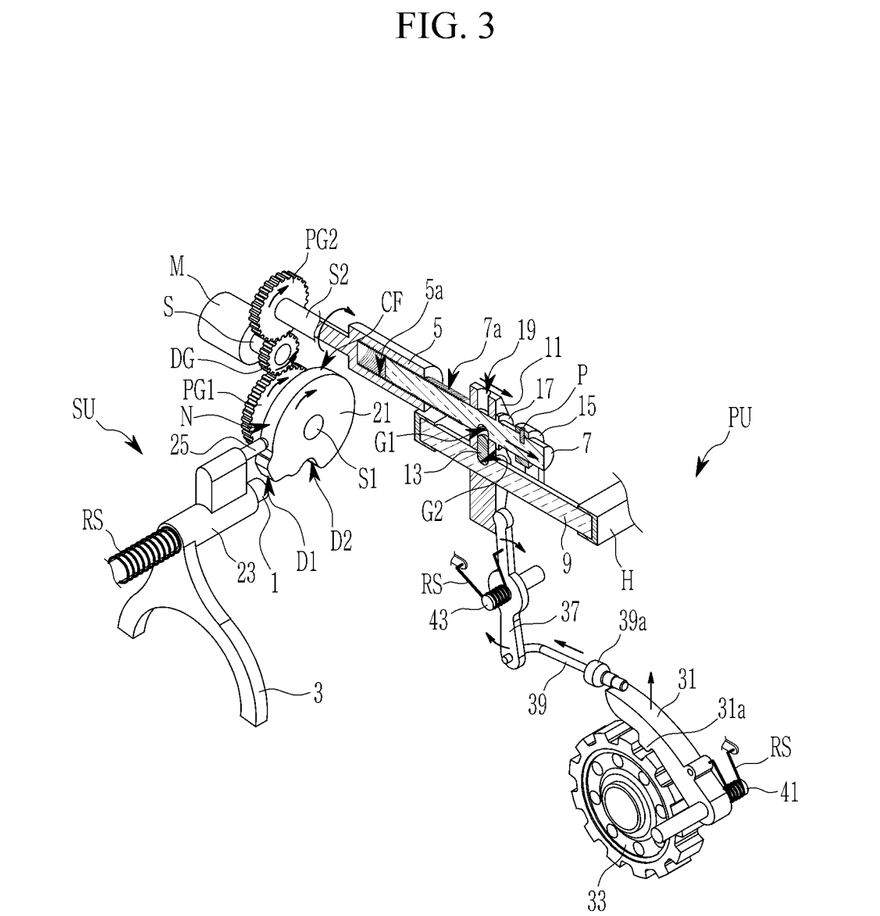
FIG. 3 to FIG. 5 respectively illustrate an operation state of a gear shifting apparatus for a multi-speed transmission for an electric vehicle according to the first exemplary form of the present disclosure.
Figure 4:
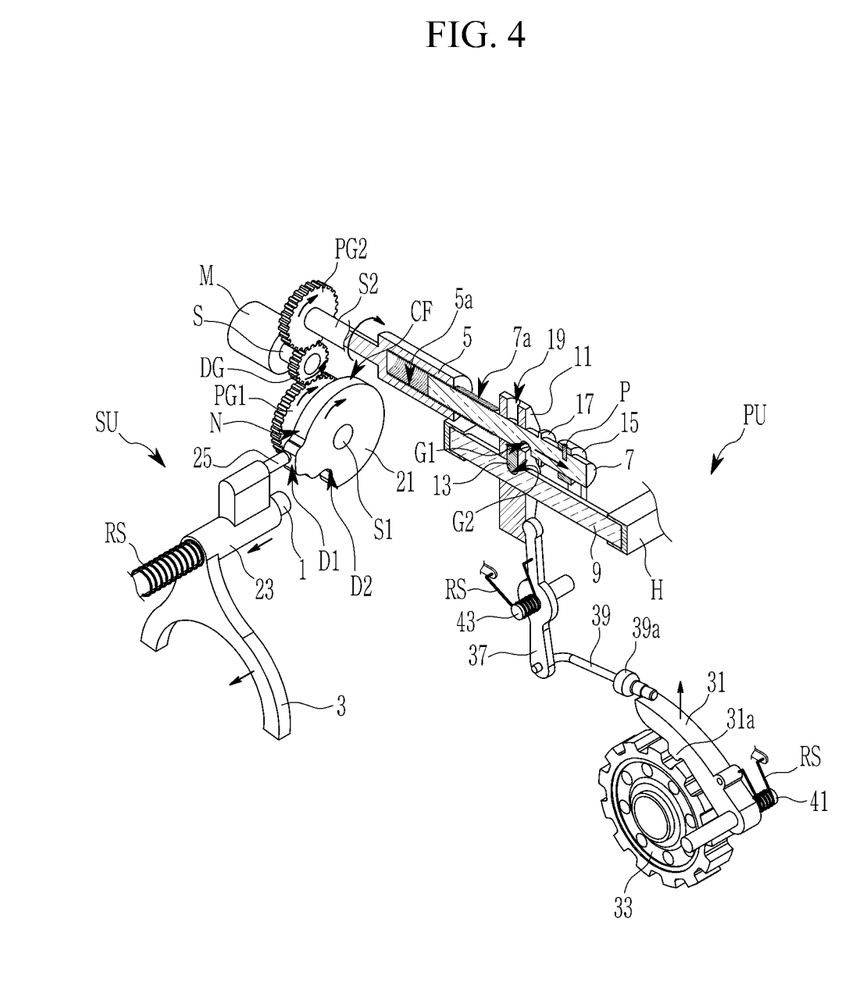
Figure 5:
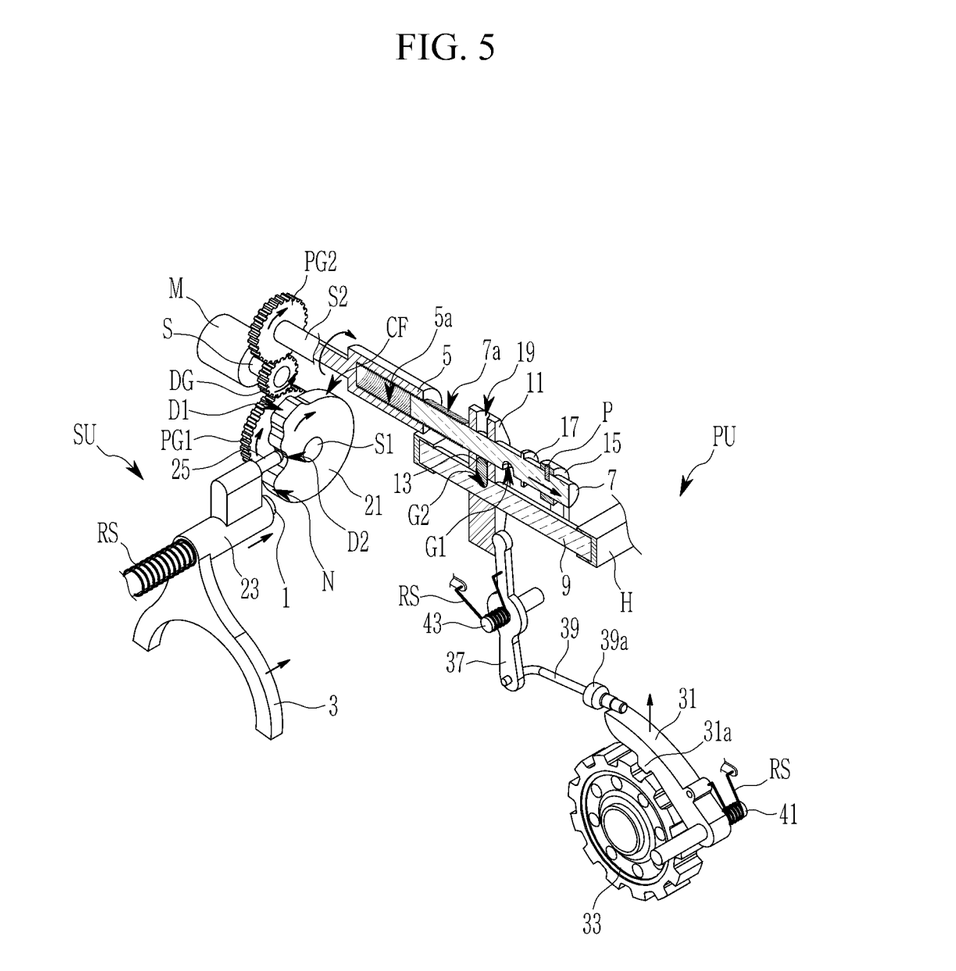

FIG. 3 to FIG. 5 respectively illustrate an operation state of a gear shifting apparatus for a multi-speed transmission for an electric vehicle according to a first exemplary form of the present disclosure.

Referring to FIG. 2 to FIG. 5, operation of a gear shifting apparatus according to a first exemplary form of the present disclosure is hereinafter described.

According to a gear shifting apparatus according to an exemplary form of the present disclosure, a control motor M controls both the shifting unit SU and the parking unit PU.

The control motor M drives the first and second driven gears PG1 and PG2 by a reduction ratio through the drive gear DG. Thereby, gear shifting is controlled through the shift fork 3 on the fork rail 1, and at the same time, engagement and disengagement of the parking gear 33 with the parking sprag 31 is also controlled.

Referring to FIG. 2 to FIG. 5, a gear shifting operation is described with respect to the parking stage, the parking release stage, the first shift-stage, and the second shift-stage.

[Parking Stage]

Referring to FIG. 2, in the parking stage, the parking rail 7 is moved to the left in FIG. 2 by the control motor M to be fully engaged with the screw housing 5, and a top end of the plunger 13 is inserted to the first plunger receiving indentation G1 of the parking rail 7, while a bottom end of the plunger 13 merely contact the exterior circumference of the guide rail 9. In this state, the plunger 13 may force the parking lug 11 in the axial direction while the parking rail 7 moves in the axial direction.

A top portion of the parking lever 37 maintains contact with the lower portion of the parking lug 11 by the elastic force of the return spring RS.

Then, the parking rod 39 is located in a forward position to the right side in FIG. 2. In this case, the cam portion 39a of the parking rod 39 presses the end of the parking sprag 31, and the engagement end 31a of the parking sprag 31 is engaged with parking gear 33. Therefore, the parking gear 33 becomes fixed in the rotating direction, and the parked stage is achieved.

In this state, the cam contact pin 25 maintains contact with the neutral range N of the cam surface CF of the cam block 21. In this state, the shift fork 3 is located in the neutral position on the fork rail 1, and therefore the neutral state is achieved by moving the sleeve (not shown) of the synchronizer (not shown) for shifting to the first shift-stage and the second shift-stage to the neutral position.

[Parking Release Stage]

Referring to FIG. 3, in the parking release stage, the parking rail 7 moves to the right in the drawing, i.e., in a release direction of the screw engagement, by the rotation of the screw housing 5 driven by the control motor M, and the parking lug 11 also moves by the plunger 13 inserted to the first plunge receiving indentation G1.

Then, the bottom of the plunger 13 is inserted to the second plunger receiving indentation G2 of the guide rail 9, and the top of the plunger 13 is released from the first plunger receiving indentation G1 of the parking rail 7.

Then the parking lever 37 is rotated by the parking lug 11 pushing the top of the parking lever 37.

By the rotation of the parking lever 37, the parking rod 39 moves to the left in FIG. 3. Accordingly, the cam portion 39a of the parking rod 39 escapes from the parking sprag 31, and thereby the engagement of the parking gear 33 with the parking sprag 31 is released. Therefore, the parking gear 33 may freely rotate, and thereby, the parking stage is released.

In such a parking release state, the cam contact pin 25 merely changes a position in the neutral range N of the cam surface CF of the cam block 21.

[First Shift-Stage]

Referring to FIG. 4, in the first shift-stage, the screw housing 5 further rotates by the control motor M from the state of the parking release stage. Then, the parking rail 7 further moves to the release direction of the screw engagement, i.e., to the right in FIG. 4.

Since the plunger 13 is decoupled with the parking rail 7, the parking lug 11 does not further moves even if the parking rail 7 further moves in the axial direction move to the right. Therefore, the parking release state is maintained.

At the same time, by the rotation of the cam block 21 driven by the control motor M, the cam contact pin 25 contacts the first shift-stage range D1 of the cam surface CF of the cam block 21.

In this case, the shift fork 3 moves to a first shift-stage position on the fork rail 1, and therefore, the first shift-stage is achieved by moving the sleeve (not shown) for shifting to the first shift-stage and the second shift-stage to the first shift-stage position.

[Second Shift-Stage]

Referring to FIG. 5, in the second shift-stage, the screw housing 5 driven by the control motor M further rotates from the state of the first shift-stage. Then, the parking rail 7 further moves to the release direction of the screw engagement, i.e., to the right in FIG. 5.

While the parking rail 7 further moves to the right from first shift-stage, the parking lug 11 maintains its position on the guide rail 9, the same as in the first shift-stage.

On the other hand, by the rotation of the cam block 21 driven by the control motor M, the cam contact pin 25 contacts the second shift-stage range D2 of the cam surface CF of the cam block 21.

In this case, the shift fork 3 moves to a second shift-stage position on the fork rail 1, and therefore, the first shift-stage is achieved by moving the sleeve (not shown) of the synchronizer (not shown) for shifting to the first shift-stage and the second shift-stage to the second shift-stage position.

Figure 6:
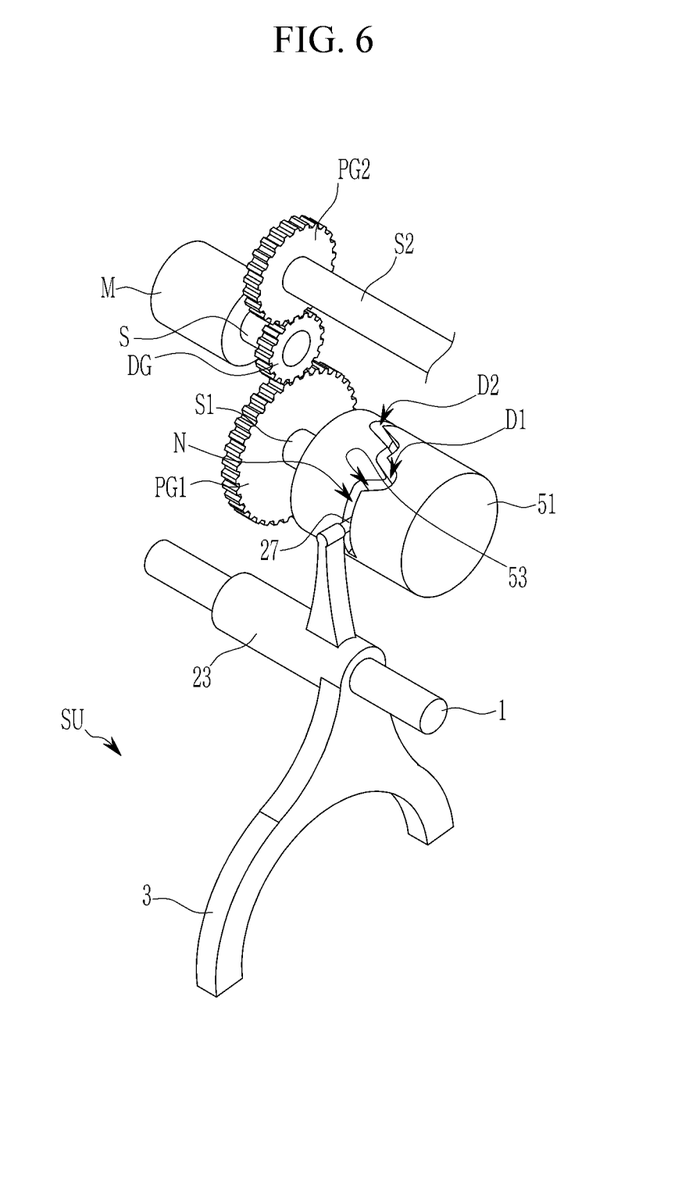
FIG. 6 is a schematic perspective view of a shifting unit applied to a gear shifting apparatus for a multi-speed transmission for an electric vehicle according to a second exemplary form of the present disclosure.

FIG. 6 is a schematic perspective view of a shifting unit applied to a gear shifting apparatus for a multi-speed transmission for an electric vehicle according to a second exemplary form of the present disclosure.

Hereinafter, a gear shifting apparatus according to a second exemplary form of the present disclosure is described in detail with reference to FIG. 6.

A gear shifting apparatus according to a second exemplary form of the present disclosure is described with reference to an example of two-staged transmission, the same as in the first exemplary form.

A gear shifting apparatus according to a second exemplary form of the present disclosure includes, the same as in the first exemplary form, an actuator, a shifting unit SU controlling gear shifting through a shift fork 3 mounted on a fork rail 1 by a torque of an actuator, and a parking unit PU receiving a torque from the actuator and controlling engagement and disengagement of a parking gear 33 through a parking sprag 31.

The actuator is the same as in the first exemplary form where a control motor M drives a drive gear DG externally gear-meshed with the driven gears PG1 and PG2 of the shifting unit SU and the parking unit PU, and the shifting unit SU and the parking unit PU converts the torque of the control motor M to horizontal forces to operate of the shift fork 3 and the parking sprag 31, the same as in the first exemplary form.

A gear shifting apparatus according to a second exemplary form of the present disclosure differs from the first exemplary form only in the arrangement of the shifting unit SU, and the actuator and the parking unit PU are the same as in the first exemplary form.

That is, the shifting unit SU according to a second exemplary form of the present disclosure includes a fork slider 23, a shift fork 3, a profile drum 51, and a profile pin 27.

The fork slider 23 is slidably mounted on a fork rail 1 fixed to a transmission housing (not shown).

The shift fork 3 is integrally formed to a lower part of the fork slider 23 slidable along the fork rail 1, and to enable synchronizer operation, is connected to the sleeve (not shown) of the synchronizer (not shown) for shifting to the first shift-stage and the second shift-stage.

The profile drum 51 is formed with a profile groove 53 for shift-stages on an exterior circumference, and is connected to a first connecting shaft S1 forming a rotation center of the first driven gear PG1 externally engaged with the drive gear DG.

The drive gear DG and first driven gear PG1 form a reduction gear ratio such that a speed reduction is realized when the torque of the control motor M is transmitted to the profile drum 51.

Gear ratios of the drive gear DG and the first and second driven gears PG1 and PG2 is set such that a reduction ratio between the drive gear DG and first driven gear PG1 is smaller than a reduction ratio between the drive gear DG and the second driven gear PG2.

The profile drum 51 converts the torque of the control motor M to a horizontal force through the curve of the profile groove 53 and transmits the horizontal force to the shift fork 3 as driving forces.

Along the exterior circumference of the profile drum 51, the profile groove 53 is formed with different phases in an axial direction, which includes ranges of a neutral range N, a first shift-stage range D1, and a second shift-stage range D2.

The profile pin 27 is integrally formed to an upper part of the fork slider 23, and inserted in the profile groove 53 formed on the exterior circumference of the profile drum 51.

As described above, a gear shifting apparatus according to a second exemplary form of the present disclosure differs from the first exemplary form only in that the profile drum 51 is employed instead of the cam block 21 to operate the shift fork 3 of the shifting unit SU. The shifting unit SU and The parking unit PU are controlled by the control motor M to form shifting operations between the parking and parking release stages and the first and second shift-stages, the same as in the first exemplary form.

Figure 7:
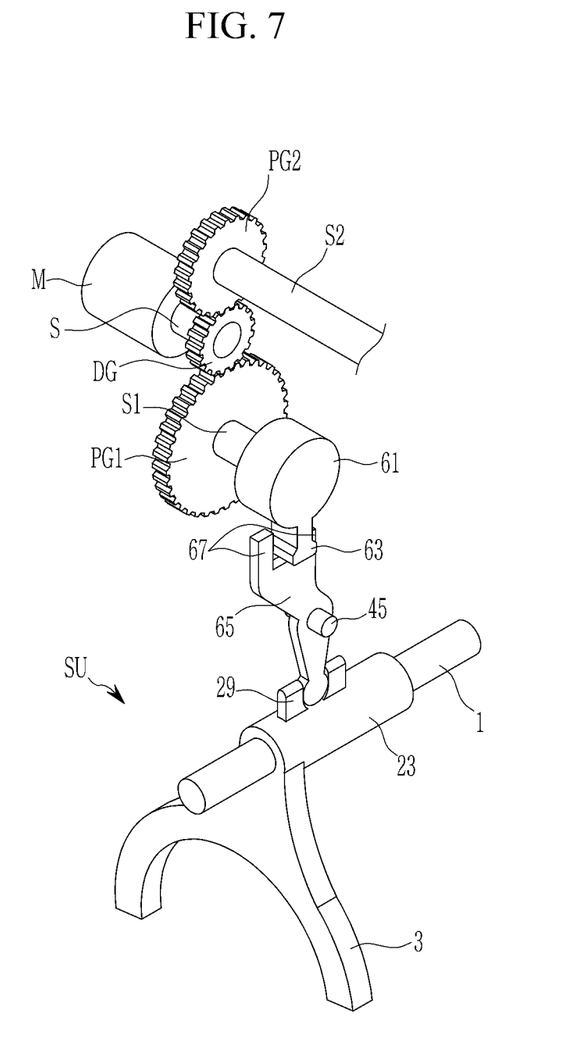
FIG. 7 is a schematic perspective view of a shifting unit applied to a gear shifting apparatus for a multi-speed transmission for an electric vehicle according to a third exemplary form of the present disclosure.
Figure 8:
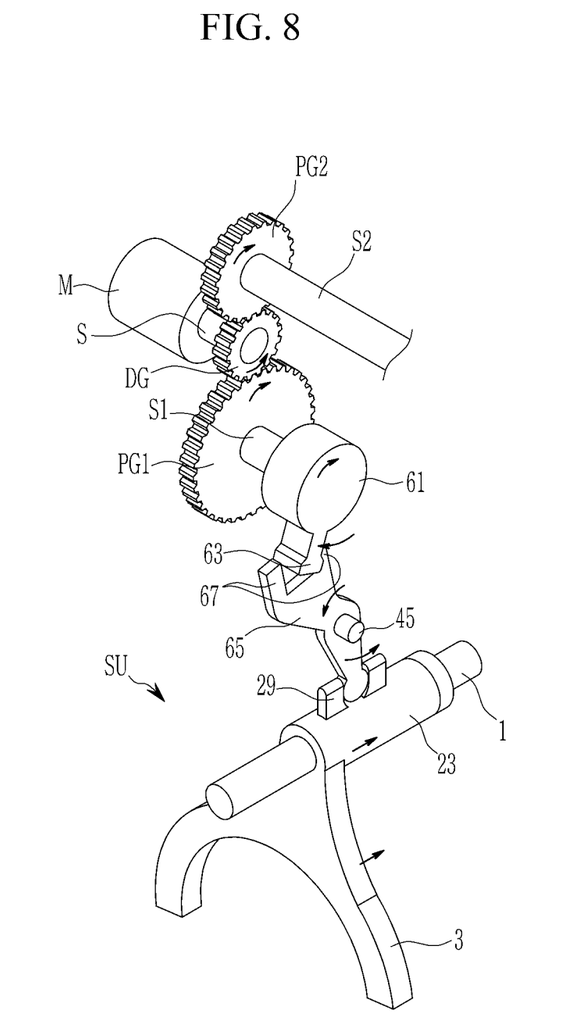
FIG. 8 is a schematic perspective view in a first shift-stage of a shifting unit applied to a gear shifting apparatus for a multi-speed transmission for an electric vehicle according to the third exemplary form of the present disclosure.

FIG. 7 is a schematic perspective view of a shifting unit applied to a gear shifting apparatus for a multi-speed transmission for an electric vehicle according to a third exemplary form of the present disclosure. FIG. 8 is a schematic perspective view in a first shift-stage of a shifting unit applied to a gear shifting apparatus for a multi-speed transmission for an electric vehicle according to a third exemplary form of the present disclosure.

Hereinafter, a gear shifting apparatus according to a third exemplary form of the present disclosure is described in detail with reference to FIG. 7.

A gear shifting apparatus according to a third exemplary form of the present disclosure is described, differently from the first exemplary form, with reference to an example of a single staged transmission.

A gear shifting apparatus according to a third exemplary form of the present disclosure includes, the same as in the first exemplary form, an actuator, a shifting unit SU controlling gear shifting through a shift fork 3 mounted on a fork rail 1 by a torque of an actuator, and a parking unit PU receiving a torque from the actuator and controlling engagement and disengagement of a parking gear 33 through a parking sprag 31.

The actuator is the same as in the first exemplary form where a control motor M drives a drive gear DG externally gear-meshed with the driven gears PG1 and PG2 of the shifting unit SU and the parking unit PU, and the shifting unit SU and the parking unit PU converts the torque of the control motor M to horizontal forces to operate of the shift fork 3 and the parking sprag 31, the same as in the first exemplary form.

A gear shifting apparatus according to a third exemplary form of the present disclosure differs from the first exemplary form only in the arrangement of the shifting unit SU, while arrangements of the actuator and the parking unit PU remains the same as in the first exemplary form.

The shifting unit SU according to a third exemplary form of the present disclosure includes a fork slider 23, a shift fork 3, a finger drum 61, and a shift lug 65.

The fork slider 23 is slidably mounted on a fork rail 1 fixed to a transmission housing (not shown).

The shift fork 3 is integrally formed to a lower part of the fork slider 23 slidable along the fork rail 1, and to enable synchronizer operation, is connected to the sleeve (not shown) of the synchronizer (not shown) for shifting to the first shift-stage.

The finger drum 61 is integrally formed with a finger end 63 on an exterior circumference thereof, and is connected to a first connecting shaft S1 forming a rotation center of the first driven gear PG1 externally engaged with the drive gear DG.

The drive gear DG and the first driven gear PG1 form a reduction gear ratio such that a speed reduction is realized when the torque of the control motor M is transmitted to the finger drum 61.

Gear ratios of the drive gear DG and the first and second driven gears PG1 and PG2 is set such that a reduction ratio between the drive gear DG and first driven gear PG1 is smaller than a reduction ratio between the drive gear DG and the second driven gear PG2.

The shift lug 65 includes a lug shaft 45 centrally positioned and rotatably supported by the transmission housing, and also includes lug ends 67 having different lengths to cooperate with, i.e., to support or release, the finger end 63 according to a rotating direction of the finger drum 61.

In addition, another end of the shift lug 65 is inserted to a pocket portion 29 formed at the fork slider 23 to interconnect the shift lug 65 and the fork slider 23.

By the cooperative interaction of the finger end 63 and the shift lug 65, the torque of the control motor M is converted to a horizontal force and transmitted to the shift fork 3.

The finger end 63 and the shift lug 65 are formed such that the shifting unit SU is only operated to the neutral stage and the first shift-stage by the rotation of the finger drum 61.

As described above, a gear shifting apparatus according to a third exemplary form of the present disclosure differs from the first exemplary form only in that the finger drum 61 and the shift lug 65 are employed instead of the cam block 21 and the cam contact pin 25 to operate the shift fork 3 of the shifting unit SU. The shifting unit SU and The parking unit PU are controlled by the control motor M to form shifting operations between the parking and parking release stage and the first shift-stage, the same as in the first exemplary form.

According to a gear shifting apparatus according to a third exemplary form of the present disclosure, the shifting unit SU only achieves the first shift-stage, which may be understood from FIG. 8.

Referring to FIG. 4 and FIG. 8, in the first shift-stage, the screw housing 5 further rotates by the control motor M from the state of the parking release stage. Then, the parking rail 7 further moves to the release direction of the screw engagement, i.e., to the right in FIG. 4.

Since the plunger 13 is decoupled with the parking rail 7, the parking lug 11 does not further moves even if the parking rail 7 further moves in the axial direction move to the right. Therefore, the parking release state is maintained.

At the same time, by the rotation of the finger drum 61 driven by the control motor M, the finger end 63 of the finger drum 61 between the two lug ends 67 of the shift lug 65 pushes a longer lug end 67 among the two lug ends 67 of the shift lug 65, thereby rotating the shift lug 65 about the lug shaft 45.

In this case, being connected to the shift lug 65 through the pocket portion 29, the fork slider 23 together with the shift fork 3 moves to a first shift-stage position on the fork rail 1, and therefore, the first shift-stage is achieved by moving the sleeve (not shown) of the synchronizer (not shown) for shifting to the first shift-stage and the second shift-stage to the first shift-stage position.

According to a gear shifting apparatus according to a first, second, third exemplary form of the present disclosure, in a multi-speed transmission of an electric vehicle, actuators of the shifting unit SU and the parking unit PU is simplified as a control motor M while enabling control of first and second shift-stages and a parking stage, thereby realizing simplified structure, a cost reduction due to less number of required parts, and a weight reduction.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A gear shifting apparatus for a multi-speed transmission for an electric vehicle, comprising:
   a shifting unit controlling gear shifting by a torque of an actuator; and
   a parking unit controlling engagement and disengagement of a parking state by the torque of the actuator,
   wherein the actuator comprises a control motor transmitting a driving torque to driven gears of the shifting unit and the parking unit through a drive gear externally gear-meshed with the driven gears, wherein the shifting unit comprises:

a fork slider slidably mounted on a fork rail;

a shift fork integrally formed with the fork slider and activating the gear shifting;

a cam block connected to a first driven gear externally engaged with the drive gear and having a cam surface on an exterior circumference for shift-stages;

a cam contact pin integrally formed with the fork slider and contacting a cam surface formed on an exterior circumference of the cam block; and a return spring mounted around the fork rail and abutting the fork slider toward the cam block.

2. The gear shifting apparatus of claim 1, wherein the parking unit comprises:

a parking gear;

a parking sprag having an engagement end facing the parking gear, being rotatable about an axis of a sprag shaft, and abutted toward a parking release direction by a return spring;

a screw housing having an interior screw hole and connected to a second driven gear externally engaged with the drive gear;

a parking rail having an exterior screw engaged with the screw hole of the screw housing and having a first plunger receiving indentation and a stopper formed on an exterior circumference of the parking rail;

a guide rail disposed in parallel with the parking rail and having a second plunger receiving indentation at a location facing the first plunger receiving indentation;

a parking lug having two penetration holes that movably receive the parking rail and the guide rail, respectively, and having an operation hole in an interior of the parking lug between the parking rail and the guide rail, in a direction perpendicular to the parking rail and the guide rail;

a plunger inserted in the operation hole of the parking lug between the parking rail and the guide rail and selectively coupled with the first plunger receiving indentation and the second plunger receiving indentation according to relative movement of the parking rail and the parking lug with respect to the guide rail;

a rotation prevention guider fixed to the parking rail and coupled with the guide rail to inhibit rotation of the parking rail;

a parking lever rotatably mounted on a lever shaft and maintaining contact with an exterior side of the parking lug by a return spring; and a parking rod connected to a bottom portion of the parking lever and having a cam portion interacting with an end of the parking sprag distal to the sprag shaft.

3. The gear shifting apparatus of claim 2, wherein a speed reduction is achieved when the torque of the control motor is transmitted from the drive gear to the first and second driven gears.

4. The gear shifting apparatus of claim 3, wherein a reduction ratio between the drive gear and the second driven gear is smaller than a reduction ratio between the drive gear and the first driven gear.

5. The gear shifting apparatus of claim 2, wherein the stopper is formed in a circular ring shape and integrally formed with the parking rail.

6. The gear shifting apparatus of claim 2, wherein the first and second plunger receiving indentations are respectively formed in a hemispherical shape; and both ends of the plunger are respectively formed in a hemispherical shape fitting the first and second plunger receiving indentations.

7. The gear shifting apparatus of claim 2, wherein the parking lever rotates at an axis of the lever shaft and thereby horizontally operates the parking rod.

8. The gear shifting apparatus of claim 2, wherein the cam portion of the parking rod presses the end of the parking sprag to force the engagement end of the sprag to engage with the parking gear.

9. The gear shifting apparatus of claim 1, wherein the cam surface comprises a neutral range, a first shift-stage range, and a second shift-stage range along the exterior circumference of the cam block.

10. A gear shifting apparatus for a multi-speed transmission for an electric vehicle, comprising:

a shifting unit controlling gear shifting by a torque of an actuator; and a parking unit controlling engagement and disengagement of a parking state by the torque of the actuator, wherein the actuator comprises a control motor transmitting a driving torque to driven gears of the shifting unit and the parking unit through a drive gear externally gear-meshed with the driven gears, wherein the shifting unit comprises:

a fork slider slidably mounted on a fork rail;

a shift fork integrally formed with the fork slider and activating the gear shifting;

a profile drum connected to a first driven gear externally engaged with the drive gear and having a profile groove on an exterior circumference for shift-stages; and a profile pin integrally formed with an upper part of the fork slider and inserted in the profile groove formed on the exterior circumference of the profile drum.

11. The gear shifting apparatus of claim 10, wherein the parking unit comprises:

a parking gear;

a parking sprag having an engagement end facing the parking gear, being rotatable about an axis of a sprag shaft, and abutted toward a parking release direction by a return spring;

a screw housing having an interior screw hole and connected to a second driven gear externally engaged with the drive gear;

a parking rail having an exterior screw engaged with the screw hole of the screw housing and having a first plunger receiving indentation and a stopper formed on an exterior circumference of the parking rail;

a guide rail disposed in parallel with the parking rail and having a second plunger receiving indentation at a location facing the first plunger receiving indentation;

a parking lug having two penetration holes that movably receive the parking rail and the guide rail, respectively, and having an operation hole in an interior of the parking lug between the parking rail and the guide rail, in a direction perpendicular to the parking rail and the guide rail;

a plunger inserted in the operation hole of the parking lug between the parking rail and the guide rail and selectively coupled with the first plunger receiving indentation and the second plunger receiving indentation according to relative movement of the parking rail and the parking lug with respect to the guide rail;

a rotation prevention guider fixed to the parking rail and coupled with the guide rail to inhibit rotation of the parking rail;

a parking lever rotatably mounted on a lever shaft and maintaining contact with an exterior side of the parking lug by a return spring; and a parking rod connected to a bottom portion of the parking lever and having a cam portion interacting with an end of the parking sprag distal to the sprag shaft.

12. The gear shifting apparatus of claim 11, wherein a speed reduction is achieved when the torque of the control motor is transmitted from the drive gear to the first and second driven gears.

13. The gear shifting apparatus of claim 12, wherein a reduction ratio between the drive gear and the second driven gear is smaller than a reduction ratio between the drive gear and the first driven gear.

14. The gear shifting apparatus of claim 10, wherein
the profile groove is formed with different phases in an axial direction of the profile drum; and
the profile groove comprises a neutral range for a neutral shift-stage, a first shift-stage range for a first shift-stage, and a second shift-stage range for a second shift-stage.

15. A gear shifting apparatus for a multi-speed transmission for an electric vehicle, comprising:
a shifting unit controlling gear shifting by a torque of an actuator; and
a parking unit controlling engagement and disengagement of a parking state by the torque of the actuator,
wherein the actuator comprises a control motor transmitting a driving torque to driven gears of the shifting unit and the parking unit through a drive gear externally gear-meshed with the driven gears,
wherein the shifting unit comprises:
a fork slider slidably mounted on a fork rail;
a shift fork integrally formed with the fork slider and activating the gear shifting;
a finger drum connected to a first driven gear externally engaged with the drive gear, and having a finger end on an exterior circumference; and
a parking lug rotatable about a centrally positioned lug shaft, having two lug ends of different lengths interacting with the finger end to support or release the finger end along a rotation direction of the finger drum, and having a coupler end coupled with a pocket portion formed at the fork slider, the coupler end being distal to the two lug ends.

16. The gear shifting apparatus of claim 15, wherein the parking unit comprises:
a parking gear;
a parking sprag having an engagement end facing the parking gear, being rotatable about an axis of a sprag shaft, and abutted toward a parking release direction by a return spring;

a screw housing having an interior screw hole and connected to a second driven gear externally engaged with the drive gear;

a parking rail having an exterior screw engaged with the screw hole of the screw housing and having a first plunger receiving indentation and a stopper formed on an exterior circumference of the parking rail;

a guide rail disposed in parallel with the parking rail and having a second plunger receiving indentation at a location facing the first plunger receiving indentation;

a parking lug having two penetration holes that movably receive the parking rail and the guide rail, respectively, and having an operation hole in an interior of the parking lug between the parking rail and the guide rail, in a direction perpendicular to the parking rail and the guide rail;

a plunger inserted in the operation hole of the parking lug between the parking rail and the guide rail and selectively coupled with the first plunger receiving indentation and the second plunger receiving indentation according to relative movement of the parking rail and the parking lug with respect to the guide rail;

a rotation prevention guider fixed to the parking rail and coupled with the guide rail to inhibit rotation of the parking rail;

a parking lever rotatably mounted on a lever shaft and maintaining contact with an exterior side of the parking lug by a return spring; and a parking rod connected to a bottom portion of the parking lever and having a cam portion interacting with an end of the parking sprag distal to the sprag shaft.

17. The gear shifting apparatus of claim 16, wherein a speed reduction is achieved when the torque of the control motor is transmitted from the drive gear to the first and second driven gears.

18. The gear shifting apparatus of claim 17, wherein a reduction ratio between the drive gear and the second driven gear is smaller than a reduction ratio between the drive gear and the first driven gear.

* * * * *